United States Patent
Ng et al.

(10) Patent No.: US 7,430,126 B2
(45) Date of Patent: Sep. 30, 2008

(54) APPARATUS AND METHOD FOR FLEXIBLY MOUNTING VARIOUSLY SIZED DEVICES IN A COMPUTER CHASSIS

(75) Inventors: Kai Ming Ng, San Jose, CA (US); Guillermo Andreas, Pleasanton, CA (US); John Norman, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 218 days.

(21) Appl. No.: 10/974,315

(22) Filed: Oct. 26, 2004

(65) Prior Publication Data

US 2006/0087792 A1 Apr. 27, 2006

(51) Int. Cl.
*H05K 5/00* (2006.01)
(52) U.S. Cl. .................. 361/752; 361/797; 361/800
(58) Field of Classification Search .................. 361/752, 361/797, 800–801, 790, 756, 759, 825; 312/223
See application file for complete search history.

(56) References Cited

U.S. PATENT DOCUMENTS 5,175,670 A * 12/1992 Wang .......................... 361/683
5,542,757 A * 8/1996 Chang ........................ 312/223.2
5,865,518 A   2/1999 Jarrett et al.
6,234,593 B1 * 5/2001 Chen et al. ................. 312/223.2
6,275,387 B1 * 8/2001 Liao et al. ................... 361/806
6,307,756 B1 * 10/2001 Liu et al. .................... 361/816
6,587,349 B1 * 7/2003 Chen ........................... 361/752

FOREIGN PATENT DOCUMENTS

EP          0 701 191          3/1996

* cited by examiner

*Primary Examiner*—Hung S. Bui (57) ABSTRACT

An apparatus and method for flexibly mounting variously sized devices in a computer chassis. A front panel includes a first portion that is reserved for a plurality of contiguous openings supporting a plurality of vertically stacked 3-½ inch bays. At least one opening is protected by a corresponding knock-out plate. The front panel also includes a second portion that is adjacent to the first portion. The second portion is reserved for a plurality of module acceptors. At least one module acceptor is located adjacent to a corresponding opening and adapted to receive a corresponding module. Additionally, at least one module acceptor includes a first attaching mechanism capable of mating with a second attaching mechanism located on the corresponding module for attaching the corresponding module to the computer chassis. Further, at least one pair of adjacent opening and module acceptor in combination is adapted to receive a front connector panel bracket.

13 Claims, 5 Drawing Sheets

APPARATUS AND METHOD FOR FLEXIBLY MOUNTING VARIOUSLY SIZED DEVICES IN A COMPUTER CHASSIS

TECHNICAL FIELD

The various embodiments of the present invention relate to mounting devices to a computer enclosure. More specifically, various embodiments of the present invention relate to a front panel that flexibly accommodates variously sized devices in a computer chassis.

BACKGROUND ART

Production computer systems have an associated industrial design that gives a unique look and feel for each computer system model to the consumer. Achieving this unique industrial design involves, in part, designing a computer chassis to follow a particular configuration for components. The particular configuration of components is integrated with a bezel that is presented to the consumer. As such, creating the industrial design required coordinated design of the computer chassis, component configuration, and bezel. As such, each model of computer system was integrated with a unique computer chassis to accommodate its associated configuration of components and bezel. That is, different devices of varying geometries required different slots in a chassis to accommodate the different devices.

Each supplier or manufacturer of computer systems can provide multiple models of computer systems that each present a unique feel and look to the consumer. As the numbers of models grow for a particular supplier, a new industrial design necessitated a new computer chassis for each of the various models of computer systems. Retooling equipment is necessary to produce a computer chassis with a new industrial design. As such, design and manufacturing costs for integrating the computer chassis to a component configuration and corresponding bezel can be quite expensive. Therefore, a need exists to reduce the design and manufacturing costs for each of the industrial designs of the various models of computer systems.

DISCLOSURE OF THE INVENTION

An apparatus and method for flexibly mounting variously sized devices in a computer chassis. A front panel includes a first portion that is reserved for a plurality of contiguous openings supporting a plurality of vertically stacked 3½ inch bays. At least one opening is protected by a corresponding knock-out plate. The front panel also includes a second portion that is adjacent to the first portion. The second portion is reserved for a plurality of module acceptors. At least one module acceptor is located to a corresponding opening and adapted to receive a corresponding module. Additionally, at least one module acceptor includes a first attaching mechanism capable of mating with a second attaching mechanism located on the corresponding module for attaching the corresponding module to the computer chassis. Further, at least one pair of adjacent opening and module acceptor in combination is adapted to receive a front connector panel bracket.

BRIEF DESCRIPTION OF THE DRAWINGS

The above and other objects and advantages of the present invention will be more readily appreciated from the following detailed description when read in conjunction with the accompanying drawings, wherein.

BEST MODES FOR CARRYING OUT THE INVENTION

Reference will now be made in detail to embodiments of the present invention, an apparatus and method for flexibly mounting variously sized devices to a computer chassis, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Accordingly, embodiments of the present invention provide an apparatus and method for mounting variously sized devices to a computer chassis. As a result, other embodiments of the present invention serve the above purpose and provide for a universal computer chassis that can accommodate variously sized devices. This promotes using one computer chassis universally for various bezels associated with unique industrial designs for various models of computing systems. As a result, design and manufacturing costs for each of the industrial designs of the various models of computer systems are reduced.

Figure 1A:
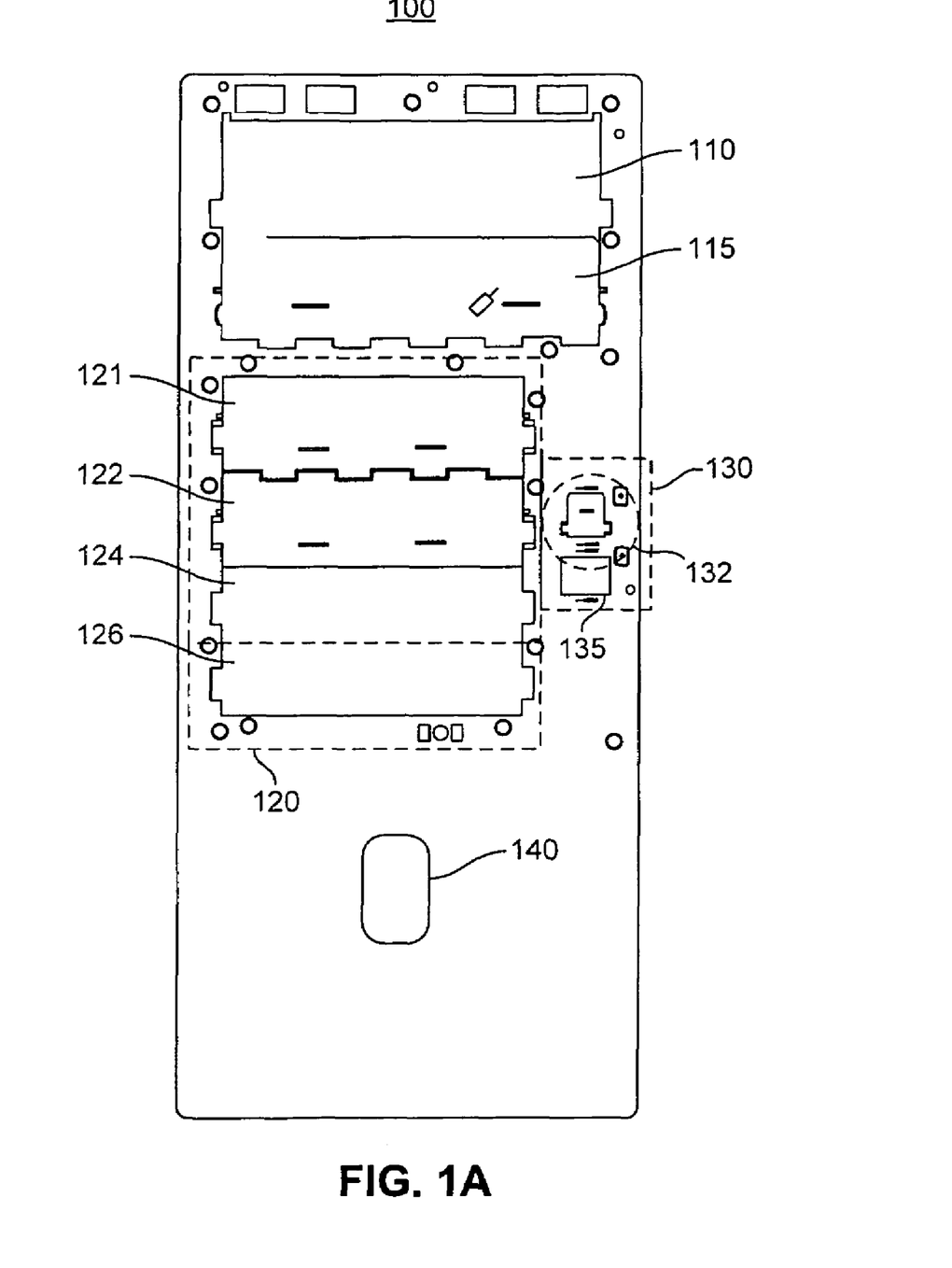
FIG. 1A is a fronts orthogonal view of a computer chassis, in accordance with one embodiment of the present invention.

FIG. 1A is front, orthogonal view of an exemplary computer chassis illustrating a front panel 100 that is designed to flexibly accommodate variously sized devices, in accordance with one embodiment of the present invention. The computer chassis, for example, is illustrative of a micro-ATX tower. As a result, the computer chassis 100 can support multiple product lines, or models, of computer systems.

The front panel 100 includes an upper optical drive bay 110 and a lower optical drive bay 115. Each of the optical drive bays 110 and 115 can support various optical drives (e.g., CD-ROM, CD-RW, DVD-ROM, DVD+RW, combination drive, etc.). The two optical drives 110 and 115 can be located at any portion of the front panel 100 by design, and is shown in the upper portion of the front panel 100 for illustration purposes only. Also, for illustration, the lower portion of the front panel includes, in part, a power button 140. The lower portion of the front panel can be located at any portion of the front panel 100 by design.

In one embodiment, one or more drive cages (not shown) can be mounted to the computer chassis to support the slots associated with the various drive bays in the computer chassis. For instance, a drive cage can provide support for various optical drives inserted into the upper optical drive bay 110. The drive cage can be mounted behind the front panel 100 and mounted to the computer chassis by conventional means such as rivets, screws or bolts.

The front panel 100 also includes a first portion 120 that is reserved for a plurality of contiguous openings. In one embodiment, the openings are contiguous in that there are no bridges for support between each of the plurality of contiguous openings. The plurality of contiguous openings support a plurality of vertically stacked 3½ inch bays, or slots. For instance, the first portion 120 includes four 3½ inch bays, as follows: bays 121, 122, 124, and 126.

Each of the plurality of vertically stacked 3½ inch bays can support mounting both standard and non-standard 3½ inch devices. Anchors (not shown) placed at strategic locations surrounding each of the 3½ inch bays allow for attaching devices or brackets to the chassis. As such, various standard and non-standard 3½ inch devices (e.g., smaller than 3½ inches) can be inserted into the 3½ inch bays. Devices that can be inserted include, for example, floppy drives, diskettes, hard drives, etc. In addition, non-standard devices greater than 3½ inches can be mounted over the 3½ inch bays in combination with an adjacent module acceptor, as will be further described below.

Each of the plurality of vertically stacked 3½ bays is protected by a knock-out plate. As such, each of the knock-out plates reduces the leakage of electromagnetic energy from components within the computer chassis. That is, the knock-out plates provide shielding from electromagnetic interference (EMI) for peripheral components and other objects external to the computer chassis.

Additionally, the front panel 100 includes a second portion 130 that is adjacent to the first portion 120. The second portion 130 is reserved for a plurality of module acceptors that are each located adjacent to a corresponding opening in the plurality of contiguous openings of the first portion 120. Each of the plurality of module acceptors is adapted to receive a corresponding module.

As shown in FIG. 1A, the second portion includes two module acceptors 132 and 135 for illustration purposes only. Other embodiments are well suited to having fewer or more numbers of module acceptors that correspond to the plurality of openings of the first portion 120.

In addition, the first portion 120 and the second portion 130 in combination can be located at any point on the front panel 100 by design, and is not limited to the middle portion of the front panel 100 as shown in FIG. 1A. For instance, the first portion 120 and the second portion 130 can be located on the upper, lower, or intermediary portion of the front panel 100.

Module acceptor 132 corresponds to 3½ inch bay 122, and module acceptor 135 corresponds to 3½ inch bay 124. Each of the plurality of module acceptors comprises a corresponding block-out plate and a first attaching mechanism, as will be further described in FIG. 1B.

Figure 1B:
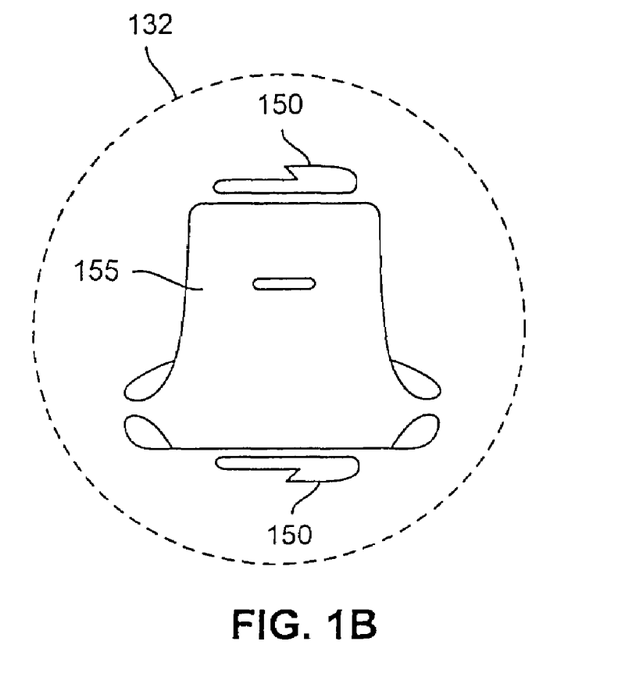
FIG. 1B is a sectional Close up view of a module acceptor, in accordance with one embodiment of the present invention.

FIG. 1B is a sectional close up view of the module acceptor 132 of FIG. 1A. The module acceptor 132 includes a knock-out plate 155. Removal of the knockout plate facilitates access within the computer chassis for wiring the corresponding module to components within the computer chassis. In addition, the module acceptor 132 includes a first attaching mechanism 150 that is capable of mating with a second attaching mechanism that is located on the corresponding module for attaching the corresponding module to the computer chassis. Each of the module acceptors also include a first attaching mechanism that is capable of mating with a second attaching mechanism on a corresponding module.

Figure 3A:
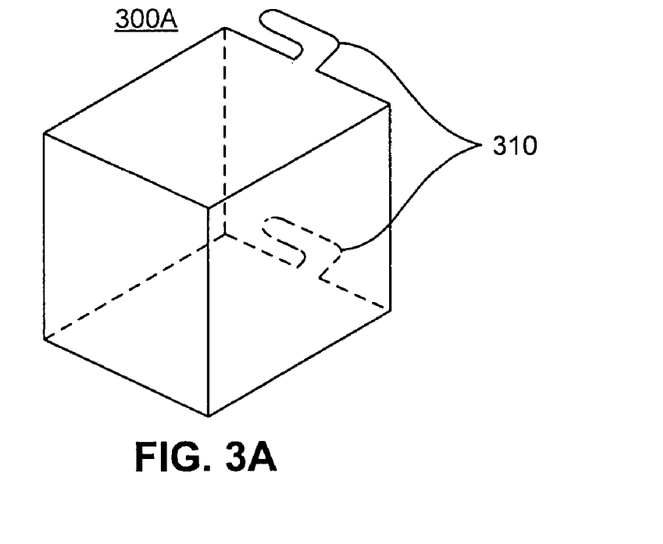
FIG. 3A is an isometric view of a module, in accordance with one embodiment of the present invention.

For instance, FIG. 3A provides an isometric view of an exemplary module 300A, in accordance with one embodiment of the present invention. The module 300A can provide various peripheral functions, such as providing data (e.g., USB) port functionality. As shown in FIG. 3A, a second attaching mechanism 310 is included and can be mated with the first attaching mechanism 150 of FIG. 1B to attach the module 300A over the module acceptor 132 to the front panel 100.

Additionally, each pair of adjacent openings and module acceptors in combination is adapted to receive a front connector panel bracket. For instance, 3½ inch bay 122 and module acceptor 132 is one pair, 3½ inch bay 124 and module acceptor 135 make another pair.

As such, each pair includes a first opening that is protected by a corresponding knock out plate. The first opening supports a first 3½ inch drive bay and is adapted to receive a standard 3½ inch device. The pair also includes a first module acceptor adjacent to the first opening that is adapted to receive a first module. The first module acceptor also includes a knock out plate. Also, the first opening in combination with the first module acceptor is adapted to receive a front connector panel bracket, wherein the first attaching mechanism is capable of mating with a third attaching mechanism on the front connector panel bracket for attaching the front connector panel bracket to the computer chassis.

Figure 2:
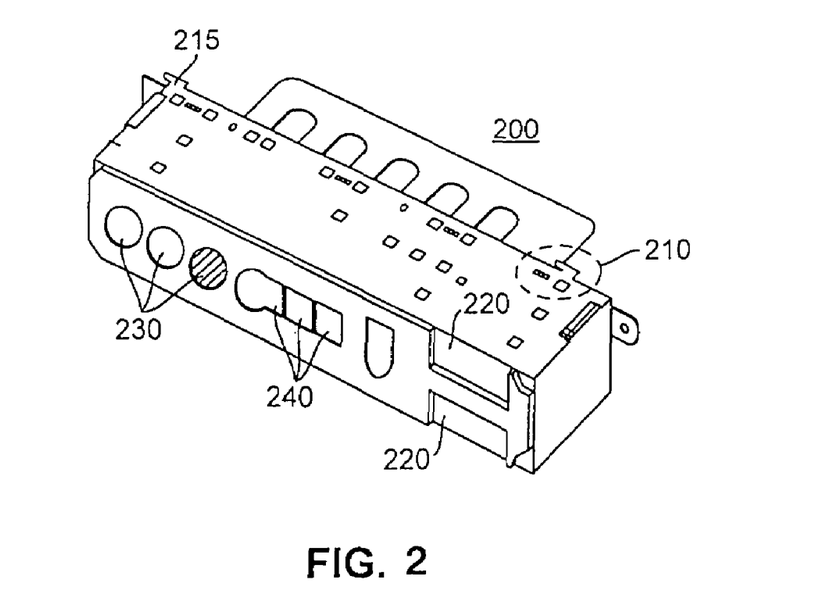
FIG. 2 is an isometric view of a front connector panel bracket, in accordance with one embodiment of the present invention.

FIG. 2 is an isometric view of an exemplary front panel connector bracket 200 that can be attached to the front panel 100 of FIG. 1, in accordance with one embodiment of the present invention. As shown in FIG. 2, for illustration only, the front panel connector bracket 200 can include audio ports 230 (e.g., left, right, etc.), data ports 220 (e.g., USB ports), and video ports 240 (e.g., S-video).

In FIG. 2, the front panel connector bracket 200 includes an exemplary third attaching mechanism 210. The third attaching mechanism 210 can be used to attach the front connector panel bracket 200 to the front panel 100 of the computer chassis of FIG. 1. For instance, the right, upper-most third attaching mechanism 210 can mate with the upper-most first attaching mechanism 150. In addition, an optional lower-most third attaching mechanism (hidden) can mate with the optional lower-most (hidden) first attaching mechanism 150 to attach the right side of the front panel connector bracket 200 to the computer chassis.

While embodiments of the present invention are shown with the attaching mechanisms as shown in FIGS. 1A, 1B, and 2, other embodiments of the present invention are well suited to supporting any type of attaching mechanism, such as anchors, hooks, screws, etc. for attaching the front connector panel bracket 200 to the front panel 100 of the computer chassis, as well as any module to the computer chassis.

In addition, the left, upper-most third attaching mechanism 215 on the front connector panel bracket 200 can be used to mate with an upper-most fourth attaching mechanism (not shown) located to a side (e.g., the left side) of the opening (e.g., 3½ inch bay 122) of the corresponding module acceptor 132. Also, the optional left, lower-most third attaching mechanism 215 (not shown) and optional left, lower-most fourth attaching mechanism (not shown) can mate. As such, the front connector panel bracket 200 can be attached to the front panel 100 on the left side.

In this case, the front panel bracket 200 can be attached to the front panel 100 over the pair of 3½ inch bay 122 and the module acceptor 132 in combination. Alternatively, the front panel bracket 200 can easily be attached to the front panel 100 over the 3½ inch bay 124 and the module acceptor 135 in combination. In addition, with proper configuration of module acceptors, the front panel bracket 200 can be attached to other 3½ inch bay/module acceptor pairs (e.g., those including 3½ inch bays 121 and 126).

As a result, the front panel 100 is able to accept varying configurations of devices and front panels in the first portion 120 and the second portion 130. That is, the combination of the 3½ inch bays and the module acceptors can be used for mounting standard 3½ inch devices and/or non-standard 3½ inch devices (e.g., front panel connectors). As such, the front panel and the corresponding computer chassis are flexible enough to support multiple product lines or models of computer systems.

For example, in one configuration of components and front connector panel bracket for the front panel 100 includes the following: a memory card reader can be inserted into the 3½ inch bay drive 121, a diskette floppy drive can be inserted in the 3½ inch bay 122, a front panel connector bracket 200 can be mounted to the pair of 3½ inch bay 124 and module acceptor 135, and a hard disk drive inserted into the 3½ inch bay 126. Another configuration of components and front connector panel bracket for the front panel 100 is as follows: a diskette floppy drive can be inserted in the 3½ inch bay 121, a front panel connector bracket 200 can be mounted to the pair of 3½ inch bay 122 and module acceptor 132, a memory card reader can be inserted into the 3½ inch bay drive 124, and a hard disk drive inserted into the 3½ inch bay 126. In both configurations, the same front panel 100 is used as a support platform.

In another embodiment, the first module acceptor 132 and the second module acceptor 135 are adapted in combination to receive a module. That is, a module can be attached to the front panel 100 of the computer chassis through the first and second module acceptors, 132 and 135, respectively. That is, the module acceptors, 132 and 135, respectively are adapted to receive the module in a vertical fashion between the two module acceptors. In another embodiment, a module can be attached to the front panel 100 through three or more module acceptors.

Figure 3B:
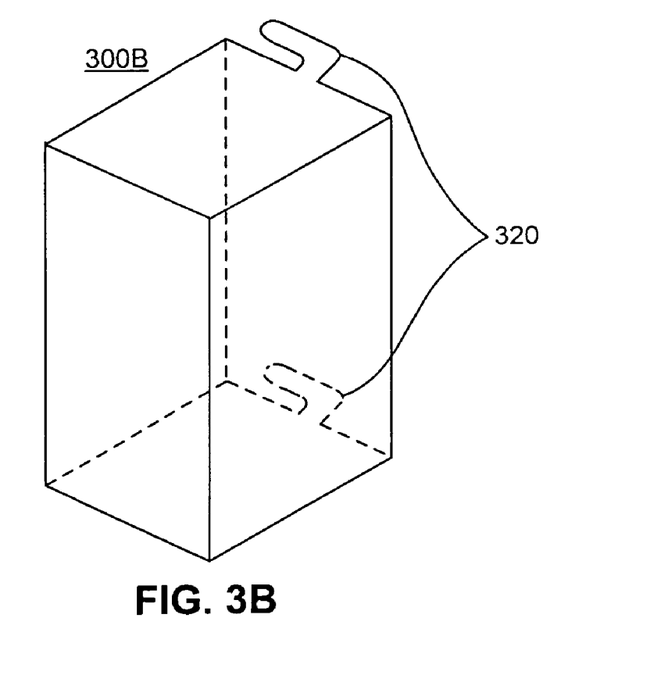
FIG. 3B is an isometric view of a module, in accordance with one embodiment of the present invention.

For instance, FIG. 3B provides an isometric view of an exemplary module 300B, in accordance with one embodiment of the present invention. The module 300B can provide various peripheral functions, such as providing data (e.g., USB) port functionality. As shown in FIG. 3B, a sixth attaching mechanism 320 is included and can be mated with the first attaching mechanism 150 of FIG. 1A to attach the module 300B over the module acceptors 132 and 135 to the front panel 100. The footprint of the module 300B is twice the footprint of the module 300A to cover two module acceptors.

Figure 4:
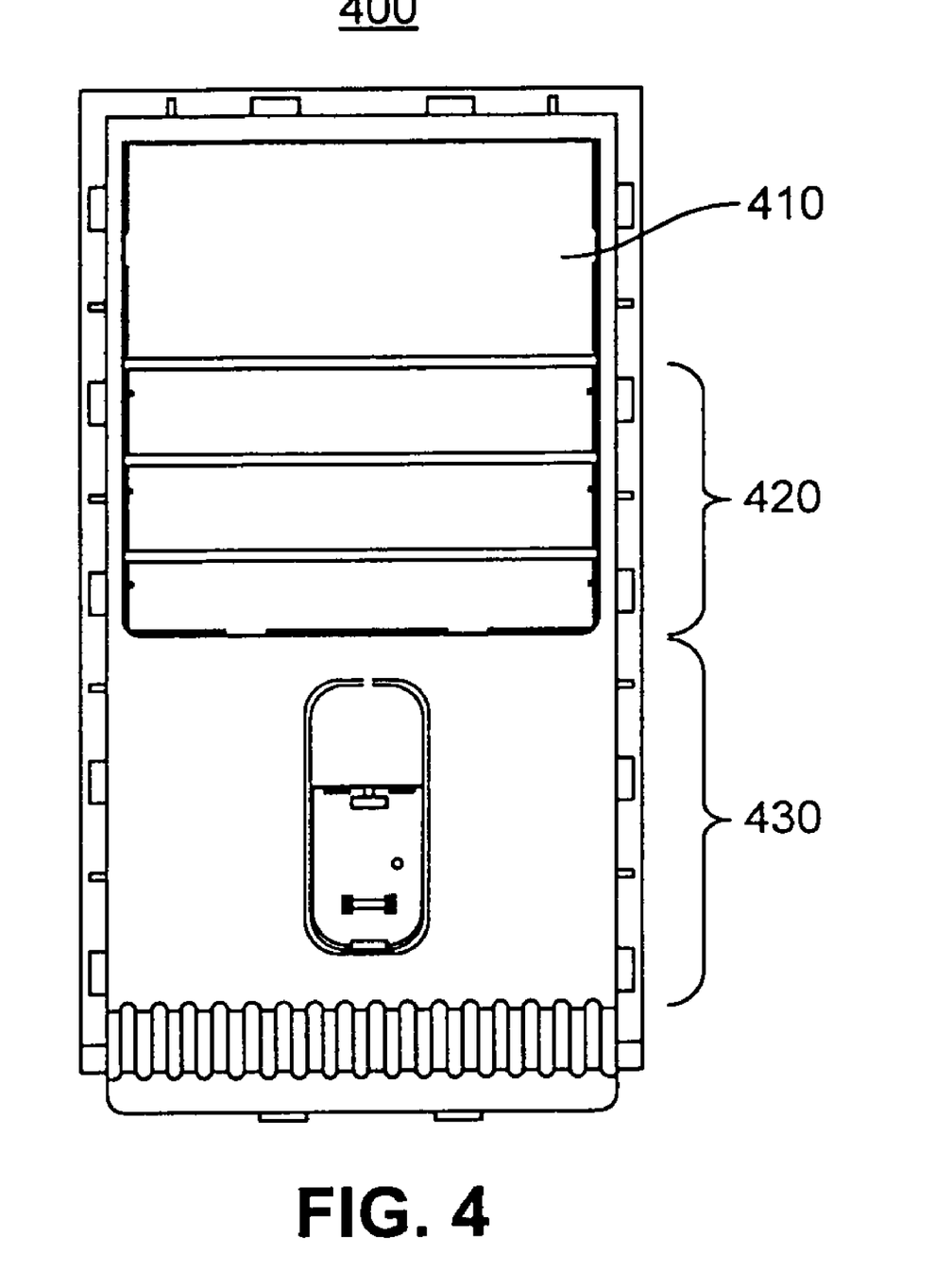
FIG. 4 is a front, orthogonal view of a bezel that is integrated with the computer chassis of FIG. 1A, in accordance with one embodiment of the present invention.

FIG. 4 is a front, orthogonal view of an exemplary bezel 400 that is integrated with the computer chassis that is designed to flexibly accommodate variously sized devices, in accordance with one embodiment of the present invention. The bezel 400 is designed to match with a configuration of components integrated with the front panel 100 of FIG. 1. The configuration also includes attaching the front connector panel bracket 200 of FIG. 2 to the front panel 100, wherein the front connector panel bracket can flexibly be located at any of the pairs of adjacent openings and module acceptors in combination. As a result, while the front panel 100 and the computer chassis are universally adaptable to varying product lines, or models of computer systems, the bezel can be designed, as part of an industrial design, that is unique to the product line or model of a particular computer system.

For instance, the bezel 400 includes a top portion 410 that is configured to match the upper and lower optical drive bays 110 and 115 of the front panel 100. In addition, a lower portion 430 is configured to match the configuration of the corresponding portion of the front panel (e.g., placement of the power button).

In addition, the bezel 400 also includes a middle portion 420 that is configured to match the first portion 120 and second portion 130 of the front panel 100. That is, the middle portion includes knock-out panels for accessing the 3½ inch drive bays in the first portion 120, and the module acceptors in the second portion 130.

Figure 5:
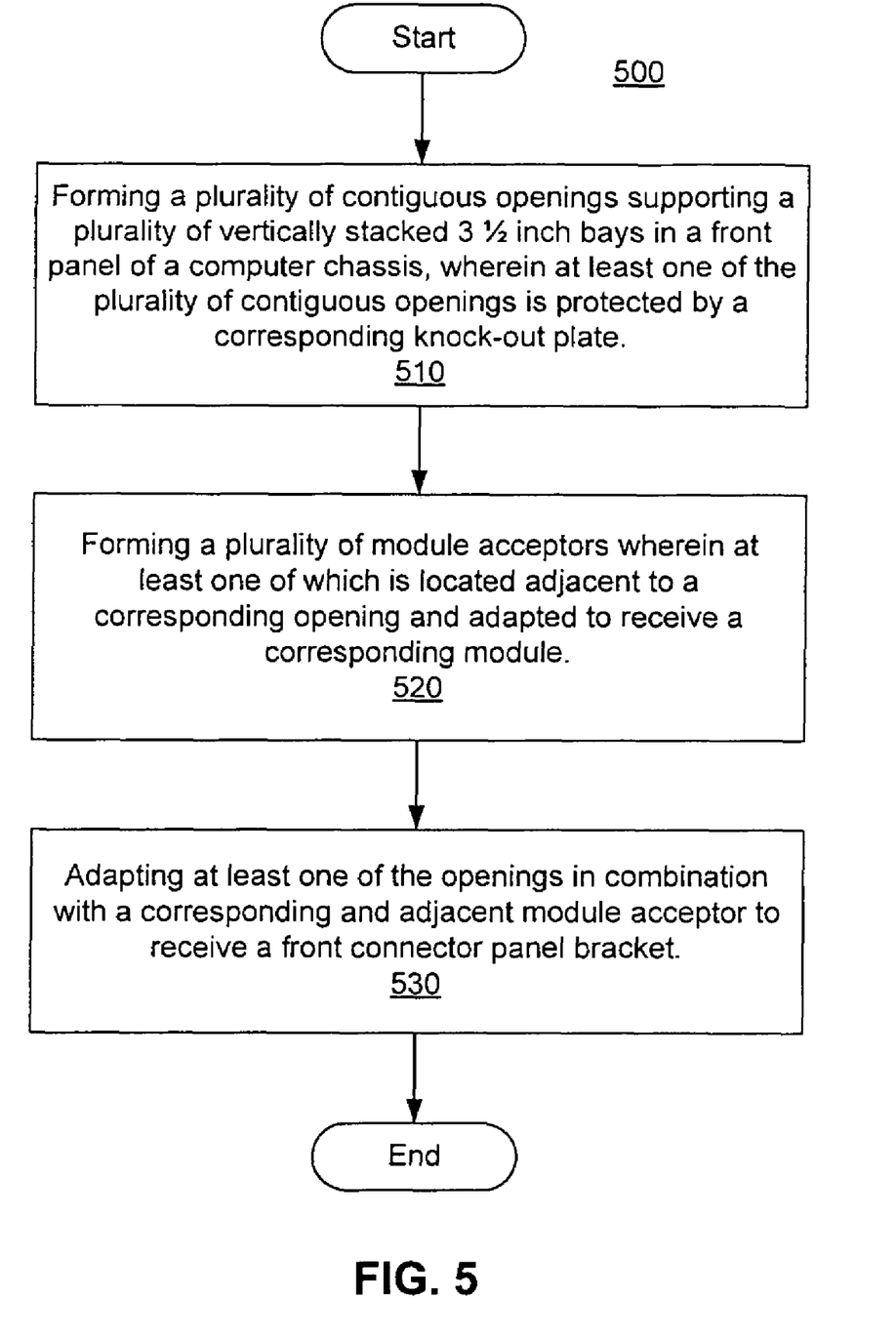
FIG. 5 is a flow chart illustrating steps in a method for flexibly mounting variously sized devices in a computer chassis, in accordance with one embodiment of the present invention.

Now referring to FIG. 5, a flow chart 500 is described illustrating steps in a method for flexibly mounting variously sized devices in a computer chassis, in accordance with one embodiment of the present invention. This promotes using one computer chassis that can support multiple product lines, or models, of computer systems.

At 510, the present embodiment begins by forming a plurality of contiguous openings. The plurality of contiguous openings support a plurality of vertically stacked 3½ inch bays in a front panel of the computer chassis. Each of the plurality of openings is protected by a corresponding knock out plate. As described previously, the knock-out plates provide electromagnetic interference shielding. In addition, each of the plurality of vertically stacked 3½ inch bays can support mounting standard and non-standard 3½ inch devices, such as, floppy drives, memory card readers, hard disk drives, etc.

At 520, the present embodiment forms a plurality of module acceptors. Each module acceptor is located adjacent to a corresponding opening, and is adapted to receive a corresponding module. The modules can perform various functions, such as, a data port (USB) functionality.

In another embodiment, vertically adjacent module acceptors are adapted to receive a module. That is, a module can be attached to the front panel 100 vertically between two or more vertically adjacent module acceptors.

At 530, the present embodiment continues by adapting each of the openings in combination with a corresponding and adjacent module acceptor to receive a front connector panel bracket.

As a result, by flexibly allowing variously sized devices to attach to a front panel of a computer chassis between pairs of contiguous openings and module acceptors, the front panel and computer chassis can by universally adapted to multiple product lines, or models, of computer systems. As such, unique bezels corresponding to particular product lines or models of computer systems can be fabricated and integrated with a particular configuration of components and front connector panel bracket implemented on a front panel of the universal computer chassis.

While the method of the embodiment illustrated in flow chart 500 shows specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

An apparatus and method for flexibly mounting variously sized devices to a computer chassis is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed is:

1. A front panel for flexibly mounting variously sized devices in a computer chassis, said front panel comprising:
   a first portion having a first plurality of contiguous openings formed therein, said openings comprising a plurality of vertically stacked 3-½ inch bays, at least one opening of said first plurality of openings protected by a corresponding knock out plate;
   a second portion adjacent to said first portion, said second portion comprising a second plurality of openings comprising a plurality of module acceptors, wherein a module acceptor of said second plurality of openings is located adjacent to a corresponding opening of said first plurality of openings, said module acceptor for receiving a corresponding module, said module acceptor comprising a first attaching mechanism for mating with a second attaching mechanism located on said corresponding module for attaching said corresponding module to said computer chassis; and
   wherein at least one pair comprising said module acceptor and said corresponding opening receives a front connector panel bracket that bridges across both said module acceptor and said corresponding opening.

2. The front panel of claim 1, wherein upon receiving said front connector panel bracket, said first attaching mechanism mates with a third attaching mechanism on said front connector panel bracket for attaching said front connector panel bracket to said computer chassis.

3. The front panel of claim 1, wherein said corresponding knock out plate provides electromagnetic interference shielding.

4. The front panel of claim 1, further comprising:
   a fourth attaching mechanism located to a side of one of said openings opposite a corresponding module acceptor, wherein upon receiving said front connector panel bracket, said fourth attaching mechanism mates with a third attaching mechanism on said front connector panel bracket for attaching said front connector panel bracket to said computer chassis.

5. The front panel of claim 1, wherein adjacent module acceptors are for receiving a module attached to said computer chassis vertically between said adjacent module acceptors.

6. The front panel of claim 1, further comprising:
   a bezel designed to match with a configuration of components and said front connector panel bracket, wherein said front connector panel bracket is flexibly located at a pair comprising a combination of one of said openings and one of said module acceptors.

7. The front panel of claim 1 further comprising:
   a plurality of anchors located next to said plurality of openings for mounting said plurality of standard and non-standard 3-½ inch devices.

8. A method for flexibly mounting variously sized devices in a computer chassis, comprising:
   forming a plurality of contiguous openings comprising a plurality of vertically stacked 3-½ inch bays in a front panel of said computer chassis, wherein at least one of said plurality of openings is protected by a corresponding knock out plate;
   forming a plurality of module acceptors, wherein at least one of said module acceptors is located adjacent to a corresponding opening and adapted to receive a corresponding module, said module acceptor comprising a first attaching mechanism for mating with a second attaching mechanism located on said corresponding module for attaching said corresponding module to said computer chassis; and
   receiving a front connector panel bracket that spans both said corresponding opening and said adjacent one of said module acceptors.

9. The method of claim 8, further comprising:
   adapting at least one of said vertically stacked 3-½ inch bays for mounting standard and non-standard 3-½ inch devices.

10. The method of claim 8, further comprising:
    adapting vertically adjacent module acceptors to receive a module attached to said computer chassis vertically between said adjacent module acceptors.

11. The method of claim 8, further comprising:
    providing electromagnetic interference shielding through said corresponding knock-out plate.

12. The method of claim 8, further comprising:
    integrating a bezel with a configuration of components and said front connector panel bracket.

13. The method of claim 8, wherein said front control panel supports various components taken from a group consisting of:
    audio jacks;
    video jacks; and
    data ports.

* * * * *

UNITED STATES PATENT AND TRADEMARK OFFICE
CERTIFICATE OF CORRECTION

PATENT NO. : 7,430,126 B2 Page 1 of 1
APPLICATION NO. : 10/974315
DATED : September 30, 2008
INVENTOR(S) : Kai Ming Ng et al.

It is certified that error appears in the above-identified patent and that said Letters Patent is hereby corrected as shown below:

In column 1, line 53, after "located" insert -- adjacent --.

In column 3, line 61, delete "block-out" and insert -- knock-out --, therefor.

Signed and Sealed this

Twenty-fourth Day of March, 2009

JOHN DOLL
*Acting Director of the United States Patent and Trademark Office*